United States Patent
Vilaro et al.

(10) Patent No.: US 9,707,718 B2
(45) Date of Patent: Jul. 18, 2017

(54) METHOD OF FABRICATING A PART BY SELECTIVE MELTING OR SELECTIVE SINTERING OF POWDER BEDS BY MEANS OF A HIGH ENERGY BEAM

(71) Applicant: SNECMA, Paris (FR)

(72) Inventors: Thomas Vilaro, Melun (FR); Olivier Chantoiseau, Livry sur Seine (FR); Sebastien Rix, Sevres (FR)

(73) Assignee: SNECMA, Paris (FR)

( * ) Notice: Subject to any disclaimer, the term of this patent is extended or adjusted under 35 U.S.C. 154(b) by 904 days.

(21) Appl. No.: 13/908,173

(22) Filed: Jun. 3, 2013

(65) Prior Publication Data

US 2013/0341838 A1    Dec. 26, 2013

(30) Foreign Application Priority Data

Jun. 6, 2012 (FR) ..................... 12 55245

(51) Int. Cl.
  *B22F 3/105*  (2006.01)
  *B29C 67/00*  (2017.01)
  *B33Y 10/00*  (2015.01)

(52) U.S. Cl.
  CPC ........ *B29C 67/0077* (2013.01); *B22F 3/1055* (2013.01); *B33Y 10/00* (2014.12); *Y02P 10/295* (2015.11)

(58) Field of Classification Search
  None
  See application file for complete search history.

(56) References Cited

U.S. PATENT DOCUMENTS 5,595,703 A    1/1997  Swaelens et al.
2004/0031780 A1  2/2004  Hagemeister et al.
(Continued)

FOREIGN PATENT DOCUMENTS

EP    1 358 855 A1    11/2003
EP    2 156 941 A1    2/2010
(Continued)

OTHER PUBLICATIONS

French Preliminary Search Report issued Mar. 5, 2013, in French 1255245, filed Jun. 6, 2012 (with English Translation of Categories of Cited Documents).
(Continued)

*Primary Examiner* — Jesse Roe
*Assistant Examiner* — Ngoclan T Mai
(74) *Attorney, Agent, or Firm* — Oblon, McClelland, Maier & Neustadt, L.L.P.

(57) ABSTRACT

A method provides a device having a feeder vessel, a building vessel with a bottom and a fabrication plate that is movable in vertical translation, a transfer system suitable for depositing powder from the feeder vessel to the building vessel as a powder layer of constant thickness, and a high energy beam optical system suitable for scanning the surface of the deposited powder layer. A powder is placed in the feeder vessel. A first series of powder layers is deposited on the fabrication plate. The particles of powder are melted or sintered to form a plurality of columns of material that are separated from one another by particles of powder. A second series of layers of powder is deposited on the first series of layers of powder particles to form a single-piece element. A thermal insulation platform is formed between the fabrication plate and said single-piece element.

12 Claims, 3 Drawing Sheets

(56) References Cited

U.S. PATENT DOCUMENTS

| | | |
|---|---|---|
| 2006/0186101 A1 | 8/2006 | Hagemeister et al. |
| 2009/0176007 A1 | 7/2009 | Uckelmann |
| 2009/0202378 A1 | 8/2009 | Illston |
| 2013/0004680 A1 | 1/2013 | Godfrey et al. |

FOREIGN PATENT DOCUMENTS

| | | |
|---|---|---|
| GB | 2 458 745 A | 10/2009 |
| JP | 8-252867 A | 10/1996 |
| WO | WO 2012/001324 A1 | 1/2012 |
| WO | WO 2012/146746 A1 | 11/2012 |

OTHER PUBLICATIONS

Examination Report issued Sep. 9, 2014, in United Kingdom Patent Application No. GB1310123.3.
Search Report issued Nov. 5, 2013, in United Kingdom Patent Application No. GB1310123.3.

METHOD OF FABRICATING A PART BY SELECTIVE MELTING OR SELECTIVE SINTERING OF POWDER BEDS BY MEANS OF A HIGH ENERGY BEAM

FIELD OF THE INVENTION

The present invention relates to the field of fabricating parts by melting or sintering powder particles by means of a high energy beam.

In non-limiting manner, such high energy beams include in particular laser beams and electron beams.

The invention relates in particular to rapid fabrication of parts by selective melting or selective sintering of powder beds by high energy beams, and more particularly by laser beam.

BACKGROUND OF THE INVENTION

The main characteristic of selective laser melting (SLM) are summarized below with reference to FIG. 1, which shows a conventional device for fabricating a part by selective melting or selective sintering of powder beds by means of a laser beam.

A first layer 10 of a powder material is deposited on a fabrication plate 80, e.g. with the help of a roller 30 (or any other deposition means), which plate may comprise a plate on its own or may be surmounted by a solid support, by a portion of some other part, or by a support grid used for facilitating building of certain parts.

The powder is transferred from a feeder vessel 70 during a go movement of the roller 30 and then it is scraped and possibly lightly compacted during one (or more) return movements of the roller 30. The powder is made up of particles 60. Excess powder is recovered in a recycler vessel 40 situated adjacent to a building vessel 85 in which the fabrication plate 80 is vertically movable.

Use is also made of a generator 90 for generating a laser beam 95 and of a control system 50 suitable for directing the laser beam 95 onto any region of the fabrication plate 80 so as to scan any region of a layer of previously-deposited powder. The shaping of the laser beam 95 and the varying of its diameter in the focal plane are performed respectively by means of a beam expander 52 and of a focusing system 54, these items together constituting the optical system.

Thereafter, a region of the first layer 10 of powder is raised to a temperature higher than the melting temperature $T_M$ of the powder by scanning the laser beam 95.

The SLM method may use any high energy beam instead of the laser beam 95, and in particular it may use an electron beam, providing the beam has sufficient energy to melt the particles of powder and some of the material on which the particles rest (also referred to as the diluted zone and forming an integral portion of the liquid bath).

By way of example, the beam is scanned by a galvanometric head forming part of a control system 50. In non-limiting manner and by way of example the control system comprises at least one steerable mirror 55 on which the laser beam 95 is reflected before reaching a layer of powder, with each point of the surface of that layer being situated at the same height relative to the focusing lens that is contained in the focusing system 54, and with the angular position of the mirror being controlled by a galvanometric head so that the laser beam scans at least a region of the first layer of powder and thus follows a pre-established profile for the part. To do this, the galvanometric head is controlled on the basis of information contained in the database of a computer tool that is used for computer-assisted design and fabrication of the part that is to be fabricated.

Thus, the powder particles 60 in this region of the first layer 10 are melted and form a first single-piece element 15 that is secured to the fabrication plate 80. At this stage, it is also possible to use the laser beam to scan a plurality of independent regions of the first layer so that after the material has melted and solidified a plurality of mutually disjoint first elements 15 are formed.

The fabrication plate 80 is then lowered by a height corresponding to the thickness of the first powder layer 10 (20 micrometers (µm) to 100 µm, and generally 30 µm to 50 µm).

Thereafter, a second powder layer 20 is disposed on the first layer 10 and on the first single-piece or consolidated element 15, and then a region of the second layer 20 that is situated in part or in full over the first single-piece or consolidated element 15 is heated by being exposed to the laser beam 95, as shown in FIG. 1, in such a manner that the powder particles in this region of the second layer 20 are melted together with at least a portion of the element 15 so as to form a second single-piece or consolidated element 25, with these two elements 15 and 25 together forming a single-piece block in the example shown in FIG. 1.

It can be understood that depending on the profile of the part that is to be built up, and in particular when there is an under-cut surface, it can happen that the above-mentioned region of the first layer 10 does not lie, even in part, under the above-mentioned region of the second layer 20, and that under such circumstances, the first consolidated element 15 and the second consolidated element 25 do not form a single-piece block.

This process of building up the part layer by layer is then continued by adding additional powder layers on the unit that has already been formed by the single-piece or consolidated elements 15, 25, . . . .

Scanning with the laser beam 95 makes it possible to build up each layer by giving it a shape that matches the shape of the part that is to be made. The lower layers of the part cool more or less quickly as the upper layers of the part are being built up.

Nevertheless, the SLM method presents drawbacks.

The powder is raised fully above its melting temperature $T_M$ by making direct use of the laser beam 95 or by entering into the bath of liquid material heated by the laser beam 95 (indirect melting of the powder). The material of the melted powder is then subjected to a temperature rise and fall cycle as the bath solidifies at its melting temperature and then cools down from $T_M$ to ambient temperature.

The bath is heated very quickly since the laser beam 95 delivers a large amount of energy to the material in a very short period of time.

The bath also cools very quickly since heat is thermally pumped from the bath by the solid block of material formed by the layers that have previously been formed under the bath and that have already solidified, and also by the fabrication plate 80.

In addition, in a very short period of time (inversely proportional to the scanning rate of the laser beam 95), the bath passes from an environment that is very hot because of its exposure to the laser beam to an environment that is subjected to a temperature close to ambient, which is equivalent to quenching in air or even to quenching in water.

These successive fast rises and falls in temperature of portions of the part while it is being built up generate stresses and/or deformations depending on the shape and the chocking of the part. The term "chocking" is used to mean the action of using a guide for supporting a thin portion of a part so as to prevent the thin portion deforming.

If the part being built up is solid and therefore not very deformable, stresses accumulate in the part while it is being fabricated, these stresses being in the form of residual stresses or even in the form of cracking when the stresses exceed the breaking stress of the material. Later, in service, if the operating temperature of the part is too high, then the part will deform as a result of such residual stresses relaxing.

If the part being built up presents walls that are thin and with little chocking (i.e. walls for which one dimension is small compared with the other two and that are free to move), the stresses generated during the cooling of each bath deform the part. These deformations lead to a part being fabricated with a final shape that is not the desired shape.

Furthermore, such deformations of the part disturb its fabrication method. Given that the positions of the material strips of a layer depend on the computer-assisted design and fabrication (CADF) file as deduced from the computer-assisted design (CAD) data processing for the part that is to be fabricated and reproducing its volume, there is a risk of an upper layer not being formed completely above a lower layer since the lower layer has been deformed and has moved away from its position as initially specified in the CADF file, for example.

The invention seeks to propose a method that makes it possible to reduce or even eliminate the stresses generated during the formation of the baths that are induced by fast heating and then during the sudden cooling of those baths.

This difficulty is particularly crucial when fabricating superalloy parts that are used in aviation, particularly but not exclusively for low-pressure or high-pressure turbine blades, nozzle parts, turbine ring portions, or combustion chamber portions.

By way of example, use is made of superalloys based on nickel, and in particular of nickel-based superalloys that are reinforced (in particular by adding titanium and/or aluminum) and that make it possible to reach operating temperatures in aviation turbines of the order of 900° C. to 1000° C.

Nevertheless, that type of material is very sensitive to hot cracking: thus, such materials tends to give rise to cracking between grains when the rate of cooling and the temperature gradients are not fully under control.

Certain solutions have already been proposed for overcoming those drawbacks.

In patent EP 1 355 760, the support on which the part is built up is itself heated.

In patent FR 2 856 614, the entire fabrication device is placed in a heated enclosure during the operation of fabricating the part.

In both situations, the idea is to avoid cooling a zone of the part excessively, or more exactly to avoid cooling it too quickly, so as to avoid cracking phenomena.

Nevertheless, those solutions are limited in temperature, since they do not make it possible to exceed 600° C.

Furthermore, those solutions require existing equipment to be greatly modified, by adding additional equipment thereto.

OBJECT AND SUMMARY OF THE INVENTION

An object of the present invention is to provide a method that makes it possible to overcome the drawbacks of the prior art and in particular that makes it possible to use a conventional device for fabricating a part by selective melting or selective sintering of powder beds by means of a high energy beam.

This object is achieved by a method of fabricating a part by selective melting or selective sintering of powder beds by means of a high energy beam, wherein the following steps are performed:

a) providing a device having a feeder vessel, a building vessel with a bottom constituted by a fabrication plate that is movable in vertical translation, a transfer system suitable for depositing powder from said feeder vessel to said building vessel as a powder layer of constant thickness, and a high energy beam optical system suitable for scanning the surface of said deposited powder layer in order to melt or sinter together the particles present in predetermined zones of the deposited powder layer;

b) providing a powder placed in said feeder vessel;

c) depositing a first series of powder layers on the fabrication plate and melting or sintering together the particles of powder after depositing each new layer of powder so as to form above the fabrication plate a plurality of columns of material that are separated from one another by particles of powder; and d) depositing a second series of layers of powder on said first series of layers of powder particles and melting or sintering together the powder particles of the second series after depositing each new layer of powder so as to form a single-piece element comprising the part and surmounting said columns of material;

whereby the columns of material of said first series of layers of powder particles form a thermal insulation platform between the fabrication plate and said single-piece element.

The powder particles in the first series of layers that have not melted or that have not sintered and that are arranged between the columns of material constitute obstacles to thermal conduction within the thermal insulation platform.

Thus, because a thermal insulation platform is arranged between the fabrication plate and said single-piece element, thermal conductivity between the part and the fabrication plate is avoided or at least reduced very greatly, so as to be no longer in the presence of the phenomenon of heat being pumped out from said single-piece element that is being fabricated and into the fabrication plate, which is itself made up of a material that is a very good thermal conductor (generally a metal).

It can be understood that after a layer of powder has been deposited the high energy beam serves not only to melt or sinter together the particles present in predetermined zones of the powder layer that has just been deposited, but also to melt or sinter together the particles present both in the powder layer that has just been deposited and in one or more adjacent layers of powder underlying said powder layer that has just been deposited.

It can thus be understood that the columns of material that result from depositing the first series of layers of particles are connected to the single-piece element resulting from depositing the second series of layers.

In this way, it can be understood that by forming the thermal insulation platform, the heat dissipated by the single-piece element as it is being built up is removed by conduction either through its sides or through intact portions of the powder layers deposited in the second series of powder layers, which present very low conductivity, or else towards the fabrication plate through the thermal insulation platform that presents conductivity that is low and much less than that of a solid portion since it is only the columns of material that enable a small fraction of the heat to be removed by the fabrication plate.

This solution also presents the additional advantage of making it possible to form the thermal insulation platform by using the same technique as that which is used for fabricating the part, thereby making the invention very easy to perform.

Overall, because of the solution of the present invention, it is possible to fabricate parts by melting or sintering powder particles by means of a high energy beam without changing the fabrication equipment and while avoiding excessive cooling rates in zones that are being fabricated, thus greatly reducing cracking phenomena.

The columns of material preferably present a width that is not zero but that is less than 1 millimeter (mm).

Advantageously, the columns of material present a width of less than 0.8 mm, and preferably less than 0.5 mm. Such columns of material present a width greater than 0.05 mm, and preferably a width greater than 0.2 mm. In general, these columns of material present a width lying in the range 0.2 mm to 0.5 mm.

Furthermore, in a preferred implementation, said single-piece element is made up of a first block of solid material deposited over the thermal insulation plate and a second block of solid material deposited over the first block of material and forming said part, said first block of material acting as a base to said part.

In this way, it can be understood that, by increasing the mass and the volume of material formed by the first block of material plus the second block of material that is being built up, the base formed by the first block of material, which is itself solid, serves, each time the beam is activated, to keep the heat induced by the high energy laser beam in those first and second blocks for a greater length of time.

Both by the presence of the thermal insulation platform and by the preferable presence of the base, the method consists in maintaining a high pre-heating temperature in the part that is being built up.

BRIEF DESCRIPTION OF THE DRAWINGS

Other advantages and characteristics of the invention appear on reading the following description made by way of example and with reference to the accompanying drawings, in which.

MORE DETAILED DESCRIPTION

In FIGS. 2 to 5, the high energy beam is preferably a laser beam and fabrication is performed by selective melting or selective sintering of powder beds by means of a laser.

Alternatively, the high energy beam could be an electron beam.

In the example of FIGS. 2 to 5, the part is a turbine engine blade 100 having a root 110, an airfoil 120, and a head 130.

Figure 1:
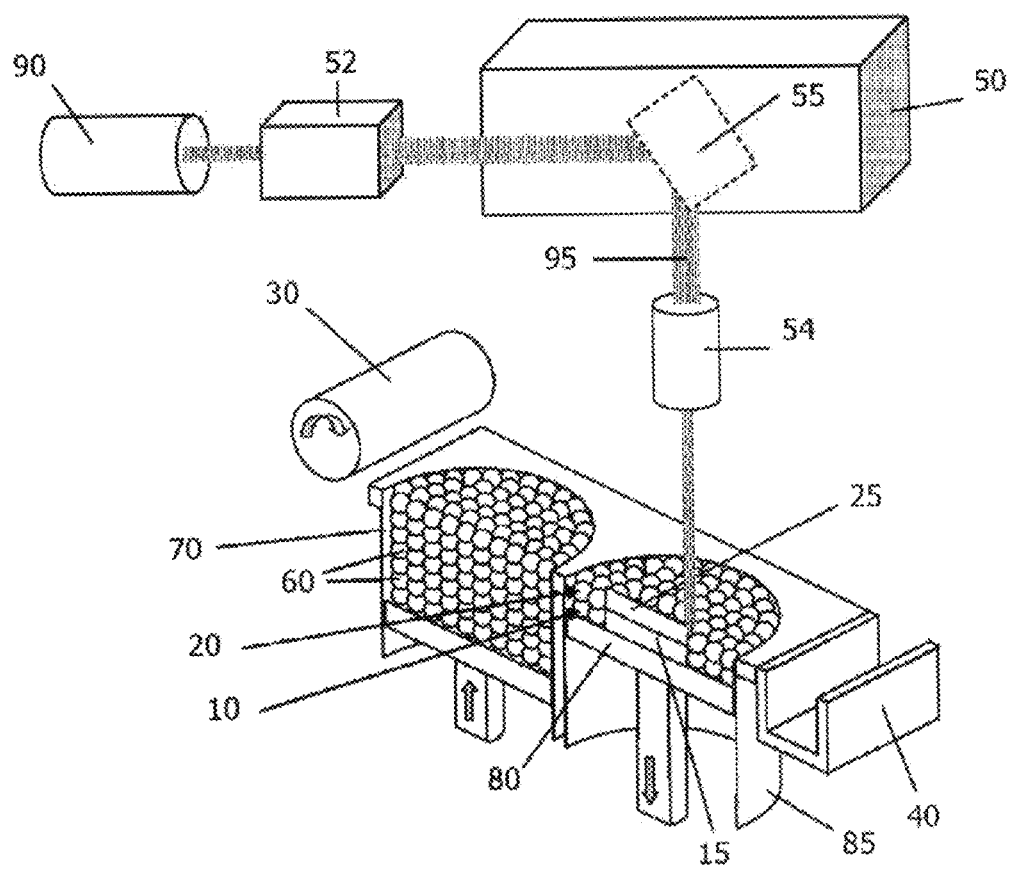
FIG. 1, described above, shows a conventional device for fabricating a part by selective melting or selective sintering powder beds by using a laser beam.
Figure 2:
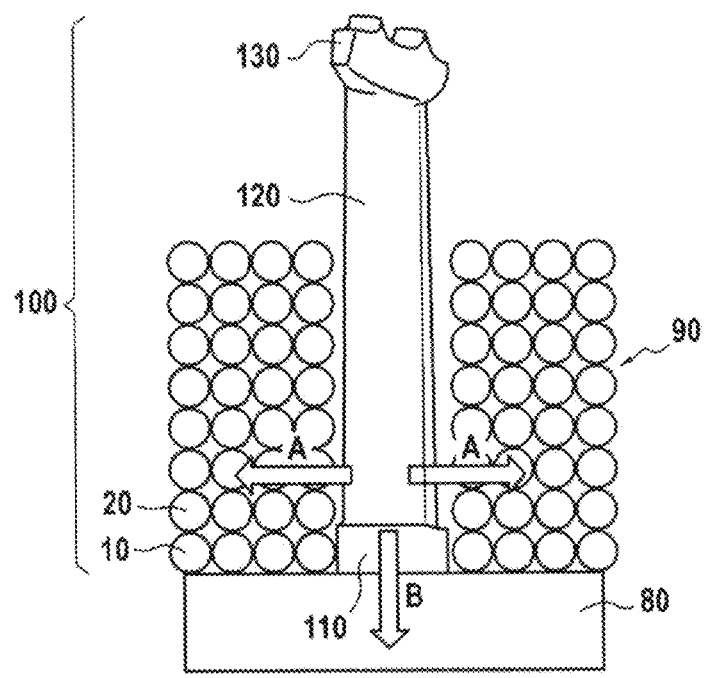
FIG. 2 shows thermal conduction phenomena that occur in a blade while it is being fabricated by a conventional fabrication method.

In the conventional method of fabricating such a blade 100, as shown in FIGS. 1 and 2, the following steps are performed:

1) depositing a first layer 10 of powder of said material on a fabrication plate 80;

2) scanning a first region of said first layer 10 with the beam 95 so as to heat the powder of said region locally to a temperature higher than the sintering temperature of the powder so that the particles of said powder as melted or sintered in this way in said first region form a first single-piece element 15;

3) depositing a second layer 20 of powder of said material on said first layer 10 of powder;

4) scanning a second region of said second layer 20 overlying said single-piece first element 15 at least in part by using the laser beam 95 to heat the powder of this second region to a temperature higher than the sintering temperature of the powder so that the particles of the powder as sintered or melted in this way form a second single-piece element 25 connected to the first single-piece element 15 and overlying it; and 5) repeating steps 3) and 4) for each new layer of powder to be deposited on a preceding layer until the blade 100 has been formed completely, beginning with the root 110 that is built up directly on the fabrication plate 80, and then continuing with the airfoil 120 and terminating the head 130, thereby obtaining a single-piece unit comprising the fabrication plate 80 and the blade 100.

In that prior art situation, and as can be seen in FIG. 2, as the blade 100 is being built up, layers of non-connected powder particles remain in position around the single-piece element that result from the melting or the sintering of the powder particles: these layers of non-connected powder particles form around the part a volume 90 into which thermal conduction is very low (arrows A), in particular in directions orthogonal to the main direction of the blade 100. The root 110 is also connected to the fabrication plate 80, which is made of a material having high thermal conductivity, thereby causing the heat generated by the high energy beam to be removed massively and quickly (arrow B) by being dissipated through the fabrication plate 80, and thus quickly cooling the bath that is generated on each pass of the high energy beam.

Figure 3:
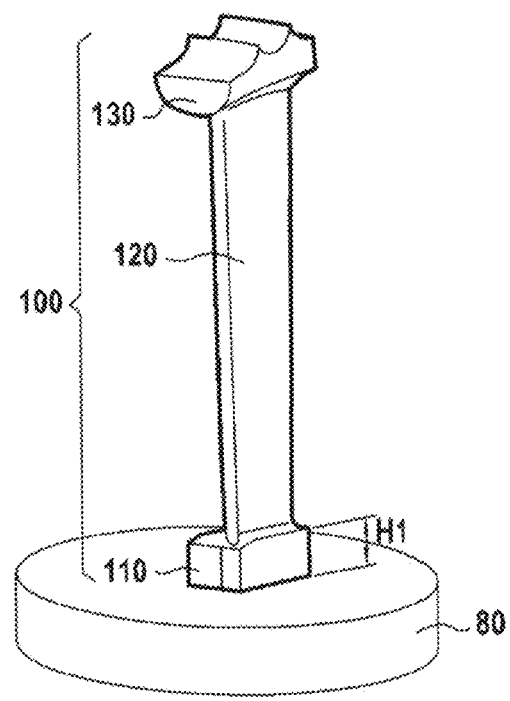
FIG. 3 shows the structure of the part obtained when fabricating a blade using the conventional fabrication method of FIG. 2.

A blade 100 is obtained of the kind shown in FIG. 3, which blade contains residual stresses or even cracks.

Figure 4:
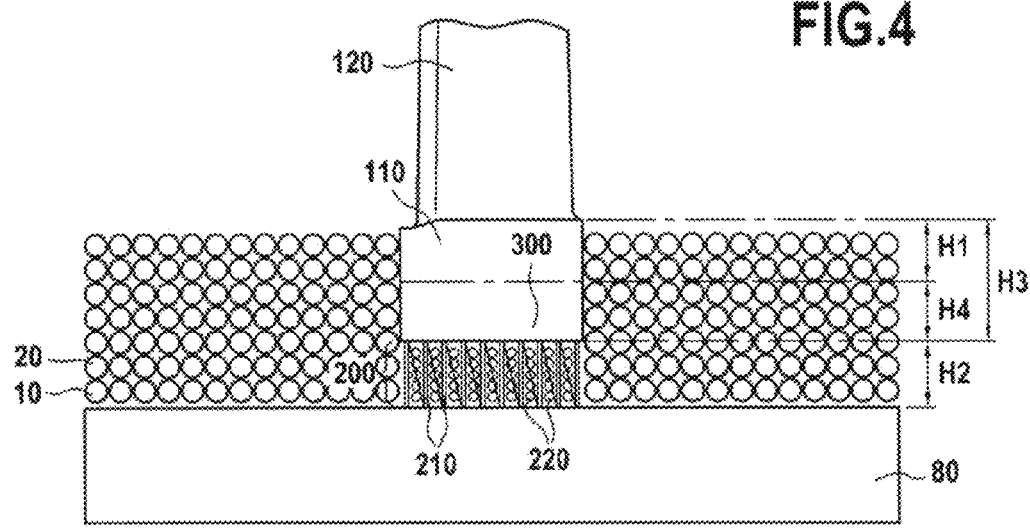
FIG. 4 shows the thermal conduction phenomena in a blade while it is being fabricated by the fabrication method of the invention.
Figure 5:
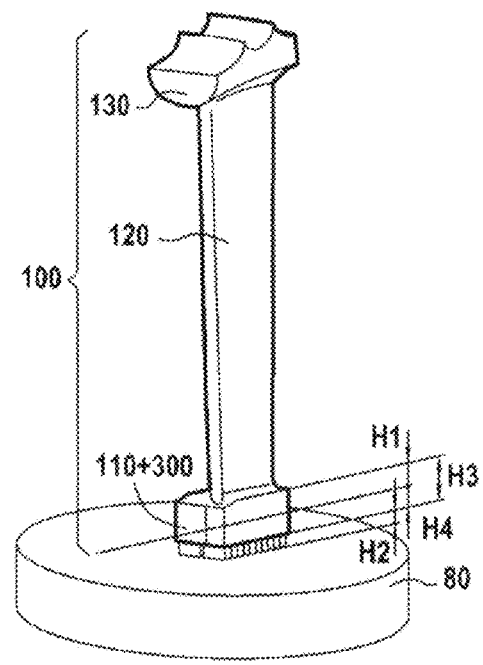
FIG. 5 shows the structure of the part obtained when fabricating a blade using the FIG. 4 fabrication method of the invention.

Reference is now made to FIGS. 4 and 5 which show the invention.

Consideration is given to additional fabrication steps for forming a thermal insulation platform 200 between the fabrication plate 80 and said single-piece element comprising the blade 100 constituting the fabricated part and that is identical in shape to that of FIGS. 2 and 3.

Before beginning to build up the root 110 of the blade 100, a step 0) is performed in which a plurality of layers of powder are deposited in succession to constitute a first series of layers of powder particles, and after each layer has been formed, discontinuous scanning is performed on multiple mutually-separate zones of very limited area (preferably less than 1 square millimeter ($mm^2$)) within the deposited layer and superposed from one layer to the next; multiple single-piece elements are formed within each of the layers, which elements constitute single-piece columns 210 of material that are surrounded by volumes 220 of powder particles.

Together the columns 210 and the volumes 220 constitute a thermal insulation platform 200 presenting a height H2. Thereafter, above-described step 1) is performed by depositing the first layer 10 not on the fabrication plate but rather on the thermal insulation platform 200.

Thereafter, in a first implementation (not shown), after step 0), and by performing above-described steps 1) to 5), the blade 100 is made directly, beginning by its root 110 that is built up directly on the thermal insulation plate 200, and then by continuing with the airfoil 120 and terminating by the head 130, thereby obtaining a single-piece unit comprising the fabrication plate 80, the thermal insulation platform 200, and the blade 100.

The columns of material 210 present a width that is not zero but less than 1 mm, and that is in particular about 0.1 mm.

Between the columns of material 210, the powder remains present and occupies the majority of the volume with thermal conductivity that is relatively low given its porosity which is about 50% to 60%.

It should be recalled that losses from the liquid bath by convection and by radiation are also very low.

By way of example, the columns of material 210 and the thermal insulation platform 200 containing said columns of material 210 may present a height H2 lying in the range 2 mm to 10 mm, and in particular equal to about 4 mm to 5 mm.

In comparison, the root 110 presents a height H1 lying in the range 5 mm to 10 mm, and in particular equal to about 7 mm.

In this way, it is possible to reduce conduction losses through the fabrication plate 80 that constitutes a solid part (it should be recalled that the term "fabrication plate" covers a plate on its own or a plate surmounted by a solid support, by a portion of another part, or by a support grid used for facilitating building certain parts), by interposing a volume that is made up essentially of particles of powder and having a thickness of several millimeters (the thermal insulation platform 200 is constituted for the most part by volumes 220 of powder) having thermal conductivity that is very low. The heat induced by the laser then remains in the bottom of the part while building up its first millimeters, and then moves upwards progressively with the stacking of the layers, thus maintaining a pre-heating temperature that is high enough within the part for eliminating any possible hot cracking of the alloy.

The proposed solution thus seeks to isolate the part from the fabrication plate 80 by supports that are fine and discontinuous at the surface of the fabrication plate 80 (the columns of material 210) so as to limit the heat flux going to the plate. The supports are naturally embedded in the volume of powder.

In a second implementation shown in FIGS. 4 and 5, after step 0), and before building up the blade 100, a step 00) is performed that consists in performing the steps 1) to 5) in order to form a solid and continuous first block of material 300 that is arranged above the thermal insulation platform 200 and directly under and vertically in line with the root 110, this first block serving as a base 300 for the root of the blade 100.

Under such circumstances, the blade 100 (or more generally the part) constitutes a second block of material arranged above the first block of material, and said single-piece element is made up of the first block of material (solid base 300) and of a second block of material forming the blade 100 (or more generally the part).

It can thus be understood that the second block of material comprises said root 110 and said airfoil 120 and that said root 110 extends the first block of material or base 300 so as to form together therewith a volume of solid material.

In FIGS. 4 and 5, it can even be seen that the base 300 and the root 110 of the blade have the same outline in vertical projection so as to overlie each other accurately and to extend each other accurately in a vertical direction.

In this second implementation, the single-piece unit comprises the fabrication plate 80, the thermal insulation platform 200, the base 300, and the blade 100 (or more generally the part).

As an example, the base 300 may present a height H4 lying in the range 10 mm to 40 mm, and may in particular be about 20 mm.

In this second implementation, forming the base 300 amounts to increasing the thickness of the root 110 of the blade by several millimeters (height H4) so that the successive scans of the volume of solid material as constituted in this way and presenting a height H3 (where H3=H1+H4) that enables a higher temperature to be maintained in said solid material of height H3.

Thus, the low portion of the blade (its root 110 and the base 300) is taller so as to form a sufficient volume of material to enable it to become hot as a result of the successive scans of the laser beam. The temperature of the portion added to the bottom of the part thus reaches a temperature that is high enough to enable the material to be fabricated soundly, i.e. to completely eliminate the problems of hot cracking of the alloy.

Said first block of material (the base 300) preferably presents a volume that is not less than that of the root 110 of the blade 100.

For example, said first block of material (the base 300) may present a height H4 that is not less than the height H1 of the root 110 of the blade 100, and that is preferably equal to the height H1 of the root 110 of the blade 100.

A blade 100 is obtained as shown in FIG. 5 that contains no or little residual stress.

The method of the present invention applies to fabricating numerous types of part and to all of the materials used in methods of fabricating a part by selective melting or selective sintering of powder beds by means of a high energy beam.

In particular, the method of the present invention applies to a powder that, after melting or sintering, forms a material that is sensitive to cracking, and in particular a material that is metallic, intermetallic, or a composite having a metallic matrix.

By way of example, said material may be a nickel-based superalloy, and in particular a superalloy that is based on nickel with a large amount of reinforcement (in particular by adding titanium and/or aluminum as in the alloys: DS200; René 77; . . . ).

What is claimed is:

1. A method of fabricating a part by selective melting or selective sintering of powder beds by an energy beam, the method comprising:
    a) providing a device having a feeder vessel, a building vessel with a bottom constituted by a fabrication plate that is movable in vertical translation, a transfer system suitable for depositing powder from said feeder vessel to said building vessel as a powder layer of constant thickness, and an energy beam optical system suitable for scanning the surface of said deposited powder layer in order to melt or sinter together the particles present in predetermined zones of the deposited powder layer;

b) providing a powder placed in said feeder vessel;

c) depositing a first series of powder layers on the fabrication plate and melting or sintering together the particles of powder after depositing each new layer of powder so as to discontinuously form above the fabrication plate a plurality of columns of material that are surrounded by volumes of powder particles so as to be separated from one another by the powder particles, each of the columns being a single-piece column; and d) depositing a second series of layers of powder on said first series of layers of powder particles and melting or sintering together the powder particles of the second series after depositing each new layer of powder so as to form a single-piece element comprising the part and surmounting said columns of material, wherein the columns of material of said first series of layers of powder particles form a thermal insulation platform between the fabrication plate and said single-piece element.

2. The method of fabricating a part according to claim 1, wherein the columns of material present a width of less than 1 mm.

3. The method of fabricating a part according to claim 1, wherein a height of the columns of material is between 2 mm and 10 mm.

4. The method of fabricating a part according to claim 1, wherein said single-piece element is made up of a first block of solid material deposited over the thermal insulation plate and a second block of solid material deposited over the first block of material and forming said part, said first block of material acting as a base to said part.

5. The method of fabricating a blade according to claim 4, wherein the part is a turbine engine blade having a root and an airfoil, and wherein the second block of material comprises said root and said airfoil and wherein said root extends the first block of material so that together they form a volume of solid material.

6. The method of fabricating a blade according to claim 5, wherein said first block of material presents a volume that is not less than the volume of the root of the blade.

7. The fabrication method according to claim 1, wherein the energy beam is a laser and fabrication is performed by selective melting or selective sintering of powder beds by laser.

8. The fabrication method according to claim 1, wherein the part is a turbine engine blade having a root and an airfoil.

9. The fabrication method according to claim 1, wherein, after melting or sintering, the powder forms a material that is sensitive to cracking.

10. The method of fabricating a part according to claim 9, wherein said material presents chemical bonds that are metallic.

11. The method of fabricating a part according to claim 10, wherein said material is a nickel-based superalloy.

12. A method of fabricating a part by selective melting or selective sintering of powder beds by an energy beam, the method comprising:

a) providing a device having a feeder vessel, a building vessel with a bottom constituted by a fabrication plate that is movable in vertical translation, a transfer system suitable for depositing powder from said feeder vessel to said building vessel as a powder layer of constant thickness, and an energy beam optical system suitable for scanning the surface of said deposited powder layer in order to melt or sinter together the particles present in predetermined zones of the deposited powder layer;

b) providing a powder placed in said feeder vessel;

c) depositing a first series of powder layers on the fabrication plate and melting or sintering together the particles of powder after depositing each new layer of powder so as to form above the fabrication plate a plurality of columns of material that are separated from one another by particles of powder, each of the columns being a single-piece column; and d) depositing a second series of layers of powder on said first series of layers of powder particles and melting or sintering together the powder particles of the second series after depositing each new layer of powder so as to form a single-piece element comprising the part and surmounting said columns of material, wherein the columns of material of said first series of layers of powder particles form a thermal insulation platform between the fabrication plate and said single-piece element, wherein said single-piece element is made up of a first block of solid material deposited over the thermal insulation plate and a second block of solid material deposited over the first block of material and forming said part, said first block of material acting as a base to said part, wherein said part is a turbine engine blade having a root and an airfoil, and wherein the method further comprises:

e) removing the first block of material.

* * * * *